(12) United States Patent
Sanchez et al.

(10) Patent No.: US 10,348,975 B2
(45) Date of Patent: Jul. 9, 2019

(54) LIGHT SYSTEM FOR A MOTOR VEHICLE

(71) Applicant: VALEO VISION, Bobigny (FR)

(72) Inventors: Vanesa Sanchez, Bobigny (FR); Kostadin Beev, Bobigny (FR); Eric Landiech, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/023,911

(22) Filed: Jun. 29, 2018

(65) Prior Publication Data

US 2019/0007595 A1    Jan. 3, 2019

(30) Foreign Application Priority Data

Jun. 30, 2017    (FR) ..................... 17 56105

(51) Int. Cl.
| | |
|---|---|
| *H04N 5/235* | (2006.01) |
| *B60Q 1/14* | (2006.01) |
| *G03B 15/03* | (2006.01) |
| *B60R 1/00* | (2006.01) |
| *H04N 7/18* | (2006.01) |

(Continued)

(52) U.S. Cl.
CPC .......... *H04N 5/2354* (2013.01); *B60Q 1/143* (2013.01); *B60R 1/00* (2013.01); *G03B 15/03* (2013.01); *H04N 7/183* (2013.01); *B60Q 1/02* (2013.01); *B60Q 2300/054* (2013.01);
(Continued)

(58) Field of Classification Search
None
See application file for complete search history.

(56) References Cited

U.S. PATENT DOCUMENTS

| | | |
|---|---|---|
| 2009/0072996 A1 | 3/2009 | Schoepp |
| 2012/0116632 A1 | 5/2012 | Bechtel et al. |

(Continued)

FOREIGN PATENT DOCUMENTS

| | | |
|---|---|---|
| EP | 1 978 295 A1 | 10/2008 |
| EP | 2 026 097 A1 | 2/2009 |
| JP | 2005 085621 | 3/2005 |

OTHER PUBLICATIONS

French Preliminary Search Report dated Feb. 27, 2018 in French Application 17 56105 filed on Jun. 30, 2017(with English Translation of Categories of Cited Documents).

*Primary Examiner* — Elmito Breval
(74) *Attorney, Agent, or Firm* — Oblon, McClelland, Maier & Neustadt, L.L.P.

(57) ABSTRACT

Motor vehicle light system including an acquisition device for acquiring the scene in front of the vehicle, including an image sensor, a first lighting device including a light source suitable for emitting a first light beam lighting up the scene so as to increase the contrast of the images captured by the image sensor, a second lighting device including a light source emitting a second light beam performing a regulatory signalling and/or lighting function in front of the vehicle, a control unit which switches on the first lighting device when a first contrast value referred to as raw contrast $C_0$ of the images captured by the image sensor is lower than a predefined threshold contrast $C_s$, the light source of the first lighting device being configured to generate modulated lighting, the modulation of which is imperceptible to the driver of the vehicle or an external observer.

20 Claims, 3 Drawing Sheets

(51) Int. Cl.
*H05B 37/02* (2006.01)
*B60Q 1/02* (2006.01)

(52) U.S. Cl.
CPC .. *B60Q 2300/314* (2013.01); *B60R 2300/108* (2013.01); *B60R 2300/205* (2013.01); *H05B 37/0218* (2013.01)

(56) References Cited

U.S. PATENT DOCUMENTS

2013/0038730 A1* 2/2013 Peterson .................. B60R 1/00
  348/148
2017/0243337 A1* 8/2017 Griffin .................. H04N 5/235

* cited by examiner

LIGHT SYSTEM FOR A MOTOR VEHICLE

The invention relates to the field of lighting and/or signalling, in particular for motor vehicles. More particularly, the invention relates to a light system for a motor vehicle and a method for controlling the light system.

A motor vehicle is generally equipped with light units intended to light up the road in front of the vehicle, during nighttime or when luminosity is reduced, i.e. when the ambient luminosity is low, or even insufficient, such as for example in a tunnel, in an underground car park, at dawn, at dusk, when the sky is overcast, etc. Motor vehicles are more often being equipped with driving assistance devices, which provide for adapting the form of light beams emitted by the light units according to traffic conditions.

These driving assistance functions can be used in combination with an acquisition device, such as for example a camera, for acquiring images of the scene located in front of the vehicle. Such a device can notably be used to detect the strips marking the edges of the traffic lane in which the vehicle is located, in front of the vehicle, in order to enable a system in the vehicle to transmit an alert to warn the driver in the event of a deviation from the trajectory of the vehicle or in the event that a marking strip is crossed. The acquisition device can also provide for measuring the distance between the vehicle and the vehicle ahead in order to ensure that a sufficient safety distance is maintained. It can also provide for detecting the presence of other vehicles on the road and adapting the projected beam so as not to dazzle the drivers of the other vehicles.

However, during nighttime or when luminosity is reduced and in rainy weather or when the road is wet, the visibility of the road markings, and in particular the strips marking the edges of the traffic lane in which the vehicle is located, is greatly reduced. A layer of water covers the marking strips and reduces the visibility of the marking strips for the driver and for the acquisition device, notably through the effect of Fresnel losses.

One solution to obtain better visibility of the marking strips consists in increasing the lighting of the scene located in front of the vehicle. However, this solution is not satisfactory since this increase in lighting must be significant for the camera to have better visibility of the scene, thereby disturbing the vehicle driver and dazzling drivers of vehicles that are oncoming or ahead due to the reflection of the light on the layer of water. Drivers are hence disturbed with respect to their driving, thereby posing a risk to their safety.

An aim of the invention is therefore to provide a light system for increasing the visibility of the scene located in front of the vehicle, for an acquisition device, during nighttime or when luminosity is reduced and in rainy weather or on a wet road, and which does not exhibit the drawbacks of the prior-art solutions.

To this end, there is provided according to the invention a motor vehicle light system including:
- an acquisition device for acquiring the scene located in front of the vehicle, including an image sensor,
- a first lighting device including at least one light source suitable for emitting a first light beam of a first intensity lighting up the said scene so as to increase the contrast of the images captured by the image sensor,
- a second lighting device including a light source emitting a second light beam of a second intensity performing a regulatory signalling and/or lighting function in front of the vehicle,
- a control unit which switches on the first lighting device when a first contrast value referred to as raw contrast of the images captured by the image sensor is lower than a predefined threshold contrast, characterized in that the light source of the first lighting device is configured to generate modulated lighting, the modulation of which is imperceptible to the driver of the said vehicle or an external observer.

Thus, by virtue of the present invention, the scene located in front of the vehicle can be made visible to the acquisition device, without disturbing the driver and without dazzling the drivers of vehicles that are oncoming or ahead. This is because the drivers do not perceive the lighting modulation generated by the light source of the first lighting device. The average intensity that they perceive is much lower than the maximum intensity emitted by the first lighting device during the modulation that enables the image sensor to capture images with a better contrast.

In the present invention, "external observer" is understood to mean drivers of vehicles that are oncoming or ahead, passengers in these vehicles and pedestrians on the roadsides or on the road.

The modulation of the lighting consists in varying the intensity emitted by the light source of the first lighting device over time.

The lighting modulation generated by the light source of the first lighting device is imperceptible to the driver either due to the wavelengths emitted by the source or due to the variation in the intensity of the source over a duration that is less than the time for the eye to perceive flickering, such that the variation in intensity of the source is imperceptible to the driver.

Specifically, the human eye does not detect variations in intensity when the variation has taken place at a frequency higher than a frequency called the cutoff frequency, equal to 50 Hz, or greater than 75 Hz. The eye therefore does not perceive a variation in intensity when the variations have taken place over a time less than a time called the flicker perception time of the eye, which is equal to $\frac{1}{50}$ s, preferably $\frac{1}{75}$ s.

The lighting modulation generated by the light source of the first lighting device is perceptible to the acquisition device which is either sensitive to the wavelengths emitted by the light source and/or capable of acquiring an image at the moment of the modulation when the intensity of the source is the highest.

As far as the Applicant is aware, there is no system today for improving the visibility of the marking strips at nighttime and in rainy weather for an acquisition device without disturbing how the vehicle driver, or drivers of vehicles that are oncoming or ahead, perceive the lighting of the scene.

The regulatory signalling and/or lighting function in front of the vehicle can be a high beam, low beam or position light function. As per the context of the invention, of interest are traffic conditions on a wet road and when luminosity is reduced or at nighttime; the second lighting device is therefore switched on even before the first lighting device is switched on.

Advantageously, the light system according to the invention includes a processing unit for the images captured by the image sensor in order to determine the contrast of these images; preferably, this processing unit is integrated in the acquisition device.

In a first example, the first lighting device includes an source of infrared light and an image sensor that is sensitive to infrared light.

In the present application, a light source can comprise one or more emitters of light.

This source of infrared light emits a light beam for making the scene located in front of the vehicle visible to the acquisition device, and notably to the image sensor while not disturbing drivers. This is because the infrared light emitted by the light source of the first device is not perceptible to the human eye. Thus, the driver does not perceive the lighting modulation generated by the light source of the first lighting device. The driver is therefore not disturbed with respect to his/her driving. And drivers of vehicles that are oncoming or ahead are also not dazzled However, the image sensor is sensitive to infrared light. This contribution of infrared light therefore provides for increasing the contrast of the images captured by the image sensor.

The source of infrared light can generate modulated lighting by emitting a light beam intermittently so as to light up the said scene in a discontinuous manner. The source of infrared light is successively switched on and switched off. The scene located in front of the vehicle becomes visible to the acquisition device when the source of infrared light is switched on and emits the light beam. The acquisition of at least one image by the image sensor is hence synchronized with the emission of the first light beam.

Preferably, the source of infrared light can generate modulated lighting by emitting a light beam in a continuous manner. The source of infrared light is permanently switched on so as to light up the said scene permanently. The source of infrared light can emit a light beam with a periodic luminous intensity profile exhibiting: a first part made up of one or more segments in which the luminous intensity is constant and equal to a positive nominal intensity, and a second part in which the luminous intensity is higher than the nominal intensity and has a duration longer than the duration of acquisition of an image by the image sensor, the sum of the duration of the two parts being equal to the duration of a period.

The duration of acquisition of an image by the image sensor can for example be less than 33 ms, preferably less than 16 ms.

The scene located in front of the vehicle is lit up permanently, and is particularly visible by the image sensor during the second part of the intensity profile of the periodic light beam. It is hence particularly advantageous for the acquisition device to acquire an image of the scene located in front of the vehicle during this second part. During the first part, the light beam emitted by the source of infrared light may not be intense enough to provide for significantly increasing the contrast of the images which would be captured by the image sensor, but other purposes can be exploited, such as for example detecting the presence of living beings on the road or in its immediate surroundings, such as animals or people.

In a second example, the first lighting device includes a source of visible light. The light system also comprises a compensation device for compensating for the first and second intensities of the light beams of the first and second lighting devices such that the lighting modulation generated by the source of visible light of the first lighting device is imperceptible to the driver.

In this second example, the image sensor is sensitive to the visible light emitted by the source of visible light.

To compensate for the first and second intensities, the compensation device controls the first and/or the second luminous intensity.

According to a first variant, the first lighting device and the second lighting device are separate.

When the first lighting device is switched on, the source of visible light emits a first periodic light beam with a periodic luminous intensity profile exhibiting a first part made up of one or more segments in which the luminous intensity is constant and equal to a positive or nil nominal intensity, and a second part in which the luminous intensity is higher than the nominal intensity, the sum of the duration of the two parts being equal to the duration of a period, the duration of a period being less than the flicker perception time of the human eye, and the compensation device reducing the second intensity so as to compensate for the first and second intensities.

Recall that in the context of the invention, the second lighting device is switched on even before the first lighting device is switched on.

The compensation device reduces the second intensity such that the average intensity of the beam projected on the road, resulting from the superimposing of the light beams from the first and second lighting devices, is identical over the entire time during which the first lighting device is activated. Thus, the lighting modulation generated by the light source of the first lighting device is imperceptible to the driver or an external observer.

According to a second variant, the first lighting device and the second lighting device are merged.

If necessary, the light source of the first lighting device can be identical to the light source of the second device. The light system hence exhibits a smaller size.

In this variant, when the first lighting device is not switched on, this indicates that the light beam emitted by the device corresponds to the second light beam. The device therefore provides for lighting up the road. When the first lighting device is switched on, the first light beam arrives at being superimposed on the second light beam. The activation of the first lighting device corresponds to a modification to the driving of the second lighting device in order to be able to perform the function of the first lighting device.

Advantageously, the compensation device drives the source of visible light in such a way that it emits a light beam with a periodic luminous intensity profile exhibiting: a first part made up of one or more segments in which the luminous intensity is constant and equal to a positive nominal intensity, a second part in which the luminous intensity is higher than the nominal intensity, and a third part made up of one or more segments in which the luminous intensity is lower than the nominal intensity over a duration such that the average intensity of the light beam is constant and equal to the nominal intensity over a period, the sum of the duration of each of the three parts being equal to the duration of a period, and the sum of the duration of the second and third parts, called compensation time, being less than the flicker perception time of the human eye.

The compensation time must be short against the flicker perception time in order that the modulation is not perceptible to the human eye. Thus, it must be less than $1/50$ s, preferably less than $1/75$ s.

In particular, the nominal intensity is equal to the second intensity.

Advantageously, when the light source of the first device emits a light beam with a periodic luminous intensity profile, the acquisition of at least one image by the image sensor is synchronized with the second part of the luminous intensity profile.

The phrase "synchronized with the second part of the luminous intensity profile" is understood to mean that the acquisition of images by the image sensor is triggered substantially at the same time as the second part of the luminous intensity profile. The acquisition of an image by the image sensor is carried out over a determined duration which depends on the acquisition device. It is necessary for at least a part of this determined duration to occur at the moment when the second part of the intensity profile is emitted, and preferably, for the whole of this determined duration to occur at the moment when the second part of the intensity profile is emitted.

The second part of the luminous intensity profile exhibits a luminous intensity greater than the luminous intensity of all the other parts of the luminous intensity profile. The road located in front of the vehicle is therefore better lit up, thereby enabling the acquisition device, and in particular the image sensor, to have better visibility of the scene located in front of the vehicle. Since the scene is better lit, the captured image suffers less from interference by noise from the sensor. Therefore, there is a better signal-to-noise ratio on the captured image during the second part of the intensity profile, which means that an image with a better contrast can be obtained.

Advantageously, the light source of the first lighting device emits P-polarized light. P-polarized light is reflected less than unpolarized light at the interface between the air and the layer of water formed on the road. It therefore better passes through the layer of water and a greater part of the light emitted is hence reflected on the road, for a given intensity, thereby allowing the driver to see the road better.

If necessary, the first lighting device can include a laser-diode type light source emitting polarized light, thereby avoiding to have to introduce a polarizer which would reduce the intensity of the beam emitted by the source.

Thus, regardless of the embodiment, by virtue of the first lighting device, better visibility of the marking strips and/or road markings is obtained for the acquisition device. The expression "better visibility" is understood to mean that the acquisition device more clearly detects the marking strips and/or road markings located close to the vehicle and that it also detects the marking strips and/or the road markings which it did not detect before the lighting of the scene was increased.

Advantageously, the motor vehicle light system includes a reproduction device for reproducing for the driver the scene located in front of the vehicle and captured by the acquisition device with a higher contrast than that of the same scene perceived by the driver without the reproduction device.

The reproduction device can be activated by the control unit.

The reproduction device can be assumed to be among, equally: a head-up display, an electronic video display screen, a liquid-crystal screen integrated in the vehicle or a portable electronic device.

Preferably, the reproduction device is an additional lighting device for lighting up frontwards of the vehicle. Advantageously, the additional lighting device is arranged to light up the strips marking the edges of the traffic lane in which the vehicle is located, in front of the vehicle.

According to a first variant, the additional lighting device is separate from the first lighting device and from the second lighting device.

According to a second variant, the additional lighting device is merged with the second lighting device.

According to a third variant, the additional lighting device is merged with the first lighting device.

For the case in which the additional lighting device and the first lighting device are merged, a distinction is drawn between the first light beam and the light beam emitted for the reproduction. The lighting modulation generated by the light source of the first lighting device is not perceived by the driver, due to the compensation performed with the second light beam. However, the driver does perceive the light beam emitted for the reproduction.

The additional lighting device includes an array of micro-mirrors, notably a DMD (Digital Micromirror Device) type component.

Alternatively, the additional lighting device includes an array of light sources. Preferably, the array includes 20 rows and 10 columns. Advantageously, the array includes 40 rows and 20 columns.

Alternatively, the additional lighting device includes a scanning system combining a laser beam and a MEMS pivoting on two orthogonal axes or two MEMS each pivoting on one axis, the axes of the said two MEMS being orthogonal with respect to one another.

Advantageously, the additional lighting device is suitable for emitting P-polarized light. The lighting supplied by the additional lighting device is hence better perceived by the driver.

The invention relates also to a control method implementing such a light system.

The control method can comprise following steps in succession.

Step 1: Acquisition of the scene located in front of the vehicle by the acquisition device, and notably by the image sensor Step 2: Calculation of the raw contrast of the images captured by the image sensor The calculation of the contrast can notably be performed by the processing unit. "Raw contrast" refers to the contrast of the images captured by the image sensor without taking into account the lighting of the first lighting device. When the first lighting device is not switched on, it corresponds to the contrast of the images captured by the image sensor, and when the first lighting device is switched on, it corresponds to the contrast that the images captured by the image sensor would have if the first lighting device was not switched on.

Step 3: Comparison of the raw contrast calculated at step 2 with the predefined threshold contrast If the raw contrast is higher than the threshold contrast, go back to step 1

This is because the first device does not need to be switched on. The scene is sufficiently visible for the acquisition device.

If the raw contrast is lower than the threshold contrast, proceed to step 4

This is because the scene is not sufficiently visible for the acquisition device. The first lighting device must therefore be switched on.

Step 4: Activation of the first lighting device

Step 5: Acquisition of the scene located in front of the vehicle by the acquisition device Step 6: Calculation of the correct contrast of the images captured by the image sensor The "correct contrast" is the contrast of the images taking into account the contribution of the lighting of the first lighting device. It corresponds to the contrast of the images captured by the image sensor when the first lighting device is switched on.

Step 7: Calculation of the raw contrast of the images captured by the image sensor taking into account the contribution of the first lighting device in the correct contrast Knowing the lighting contribution of the first lighting device and the correct contrast calculated at step 6, it is possible through a calculation to deduce the raw contrast.

Step 8: Comparison of the raw contrast calculated at step 7 with the predefined threshold contrast Only the raw contrast can be compared with the predefined threshold contrast. This is because the raw contrast corresponds to the contrast of the scene without the lighting contribution of the first lighting device. The correct contrast is inevitably higher than the threshold contrast.

If the raw contrast is higher than the threshold contrast, proceed to step 9

If the raw contrast is lower than the threshold contrast, go back to step 5. Optionally, the activation of the device for reproducing the scene located in front of the vehicle can be activated, during a step 10, before returning to step 5.

Step 9: Switch-off of the first lighting device and return to step 1

The invention relates also to a motor vehicle including such a light system or means for implementing such a method.

Other features and advantages of the present invention will become clearer with the aid of the description and the drawings in which:

FIG. 1 schematically represents in partial cross-section a vehicle equipped with a light system according to the present invention;

Figure 3A:
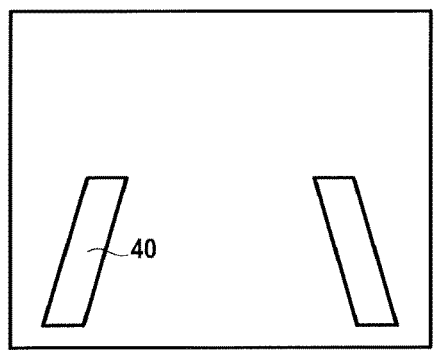
Figure 3B:
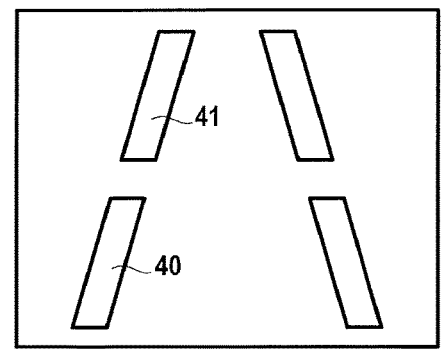
Figure 4:
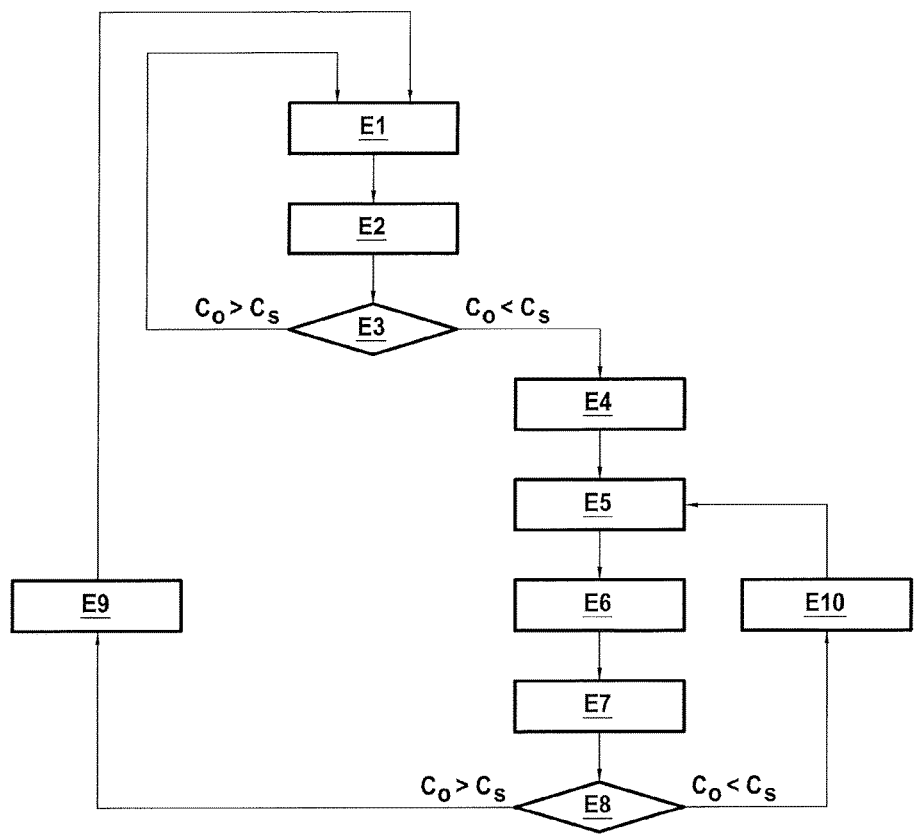

FIG. 3a schematically represents the scene located in front of the vehicle in the absence of an active additional lighting device;

FIG. 3b schematically represents the scene located in front of the vehicle when the additional lighting device is activated;

FIG. 4 represents the various steps of the method implementing a light system according to the present invention.

Figure 1:
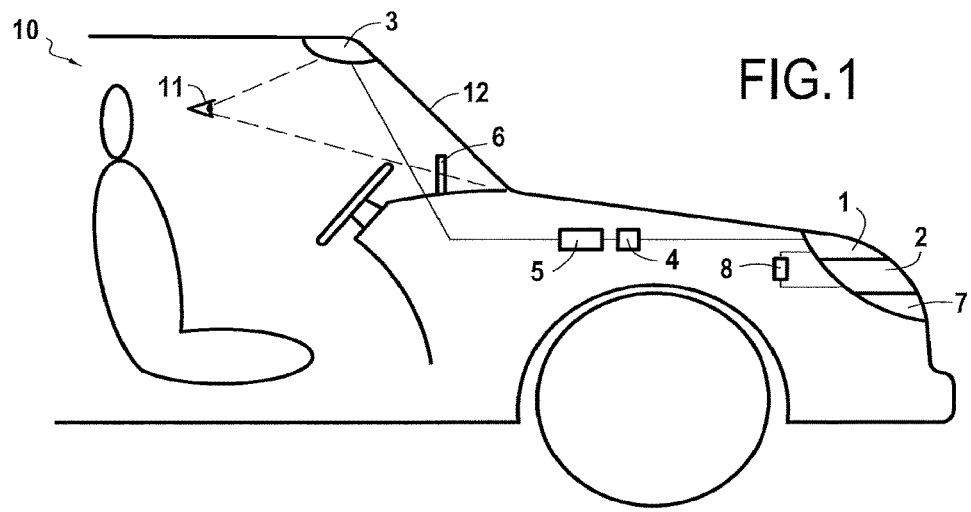

With reference to FIG. 1, there is schematically represented a partial cross-section of a vehicle 10 equipped with light units 9 and driven by a driver represented by his/her eye 11. The driver 11 observes the scene SA located in front of the vehicle through the windscreen 12.

The light unit 9 is equipped with several lighting devices: a first lighting device 1, a second lighting device 2 and an additional lighting device 7. The second lighting device 2 is equipped with a light source suitable for generating a low beam type light beam, meeting the requirements of regulation ECE R112, it being understood that a person skilled in the art will know how to adapt the invention in order that this second lighting device 2 satisfies the requirements of any other national or regional regulation. In FIG. 1, the first lighting device 1 and the second lighting device 2 are separate.

In accordance with the present invention, the vehicle is equipped with an acquisition device 3 suitable for acquiring images of the scene SA located in front of the vehicle. The acquisition device 3 includes an image sensor for capturing images of the scene SA located in front of the vehicle. The acquisition device can notably take the form of a camera comprising a CMOS sensor for example, or a CCD sensor.

The acquisition device 3 is connected to a processing unit 5 for processing images captured by the image sensor. The processing unit 5 provides for determining the raw contrast of the images captured by the image sensor. For the processing unit 5 to calculate the raw contrast of the images captured by the image sensor, it is connected to the activation control of the first lighting device in order to be continuously aware of whether the first lighting device is switched on.

When the first lighting device is switched on, the processing unit 5 can notably calculate the raw contrast value from the correct contrast value. By taking into account the lighting contribution of the first lighting device in the contrast of an image captured by the image sensor, the processing unit 5 can calculate the raw contrast.

The raw contrast value is then transmitted to a control unit 4 which switches on the first lighting device 1 when the raw contrast is lower than a predefined threshold contrast, or which leaves the first lighting device 1 switched on when it is already switched on.

This predefined threshold contrast corresponds to the contrast from which it can be considered that the luminosity is too low for the driver and the acquisition device to be able to correctly see the scene SA located in front of the vehicle and notably the marking strips.

When the first lighting device 1 is switched on, the lighting modulation generated by the light source of the first lighting device 1 is not perceptible to the driver 11 or an external observer while it is perceptible to the acquisition device 3. The acquisition device 3 perceives the effect of the light emitted by the first lighting device 1 on the lighting of the scene SA.

The light source of the first lighting device 1 can be a source of infrared light. The radiation from the source is then invisible to the human eye. Only the image sensor must then be sensitive to infrared light. The lighting-up of the scene with the aid of the source of infrared light thus enables the image sensor to capture the images of the scene SA located in front of the vehicle with better contrast than if there were no lighting.

The light source of the first device can alternatively be a source of visible light. The image sensor is then sensitive to the visible light emitted by the source of visible light. For the lighting modulation generated by the light source of the first lighting device 1 to be imperceptible to the driver 11 or to an external observer, the first lighting device 1 and the second lighting device 2 are connected to a compensation device 8 for compensating for the first and second intensities of the light beams emitted by the first 1 and second 2 lighting devices. The compensation performed by the compensation device 8 is detailed in FIGS. 2a and 2b.

The activation of the first lighting device 1 does not disturb the driver or an external observer since, once activated, the lighting modulation generated by the light source of the first lighting device 1 is imperceptible to the driver or an external observer. Thus, once activated and throughout the time over which the first lighting device 1 is activated, the lighting of the scene SA located in front of the vehicle is perceived by the driver 11 or an external observer as not being modified. However, the contrast of the images captured by the image sensor is definitely modified. Image acquisition by the image sensor is synchronized with the emission of light from the first lighting device 1 such that the scene SA located in front of the vehicle is visible on at least some of the images captured by the image sensor. The processing unit 5 can notably detect on these images the positions of the marking strips which are not visible to the driver.

To enable the driver to know the positions of these marking strips, the vehicle is equipped with a reproduction device. This reproduction device can for example be formed by a head-up display 6 or even an electronic video display screen, a liquid-crystal screen integrated in the vehicle or a portable electronic device.

According to one variant also represented in FIG. 1, the reproduction device can be an additional lighting device 7, for lighting up frontwards of the vehicle. It notably provides for lighting up the strips marking the edges of the traffic lane in which the vehicle is located, in front of the vehicle.

Figure 2A:
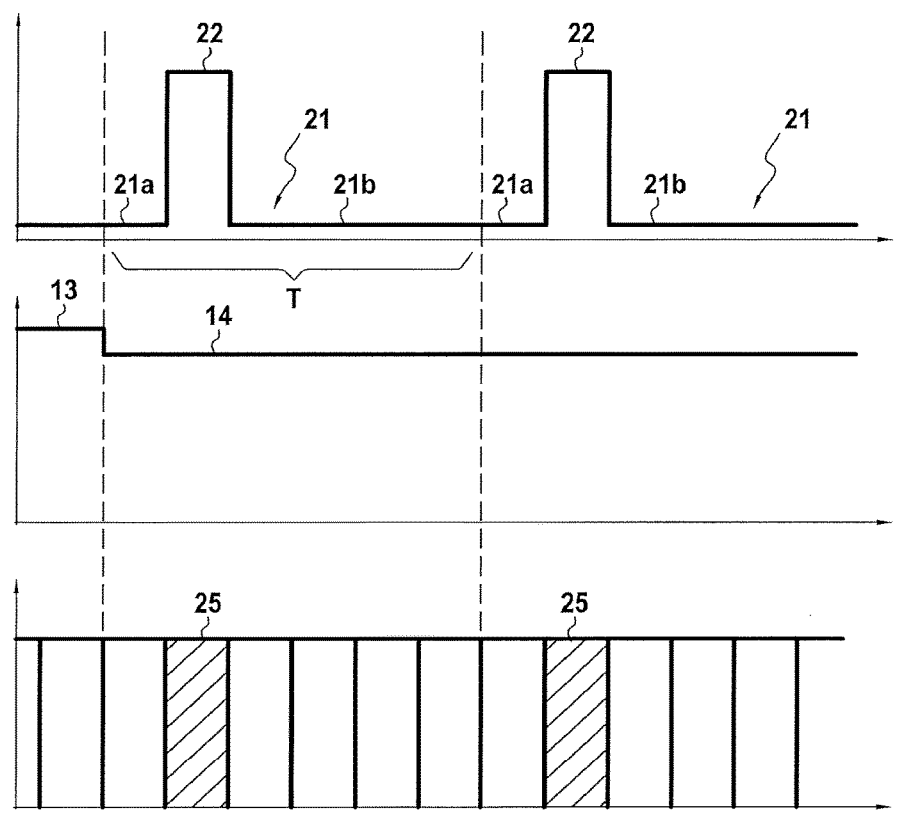
FIG. 2a represents the luminous intensity profiles of the light beams emitted by the first and second lighting devices over time for the case in which the two lighting devices are separate, and the acquisition of images by the image sensor.

FIG. 2a represents the luminous intensity profiles of the beams emitted by the first and second lighting devices, for the case in which the light source of the first lighting device 1 is a source of visible light and when the first lighting device 1 and the second lighting device 2 are separate.

In the context of the invention, the vehicle 10 is in nighttime traffic, or when luminosity is reduced. The second lighting device 2 is therefore switched on.

When the raw contrast of the scene SA located in front of the vehicle becomes lower than the threshold contrast value, the first lighting device 1 is switched on by the control unit 4.

When the first lighting device 1 is switched on, the source of visible light emits a first light beam, periodic in time, with a periodic luminous intensity profile.

The periodic luminous intensity profile exhibits:
a first part 21 made up of two segments 21a and 21b in which the luminous intensity is constant and equal to a positive or nil nominal intensity, and
a second part 22 in which the luminous intensity is higher than the nominal intensity;

The sum of the duration of the first 21 and second 22 parts is equal to the duration of a period T. The duration of a period is less than the flicker perception time of the human eye.

Simultaneously, the compensation device 8 reduces the second intensity. The second intensity changes from a maximum value 13 to a value 14 that is less than the maximum value 13. The reduction in the second intensity is calculated by the compensation device such that the driver or an external observer does not perceive a change in the lighting of the scene SA located in front of the vehicle during the lighting modulation generated by the light source of the first lighting device 1. As a function of the luminous intensity of the first part 21 of the luminous intensity profile of the first light beam of the light source of the first lighting device 1, it is possible to play on the visual signature of the vehicle. This is because the higher the luminous intensity of the first part 21, the lower the value 14 of the second intensity. Thus, an observer external to the vehicle 10 will distinguish even more the first lighting device 1 and will see that the second intensity is attenuated.

The image sensor is synchronized with the second part 22 of the luminous intensity profile. The acquisition of an image 25 is triggered at the moment of the transition to the second part 22 of the intensity profile. Furthermore, the image sensor exhibits a sufficiently high acquisition frequency so as to be able to acquire at least one image 25 during the second part 22 of the luminous intensity profile of the first light beam of the light source of the first lighting device 1.

During acquisition of this image 25, the scene SA located in front of the vehicle is lit up by the first device 1 with maximum intensity. It is therefore particularly visible on this image 25. The processing unit 5 can notably detect the positions of the marking strips on this image 25 which are not visible to the driver.

Figure 2B:
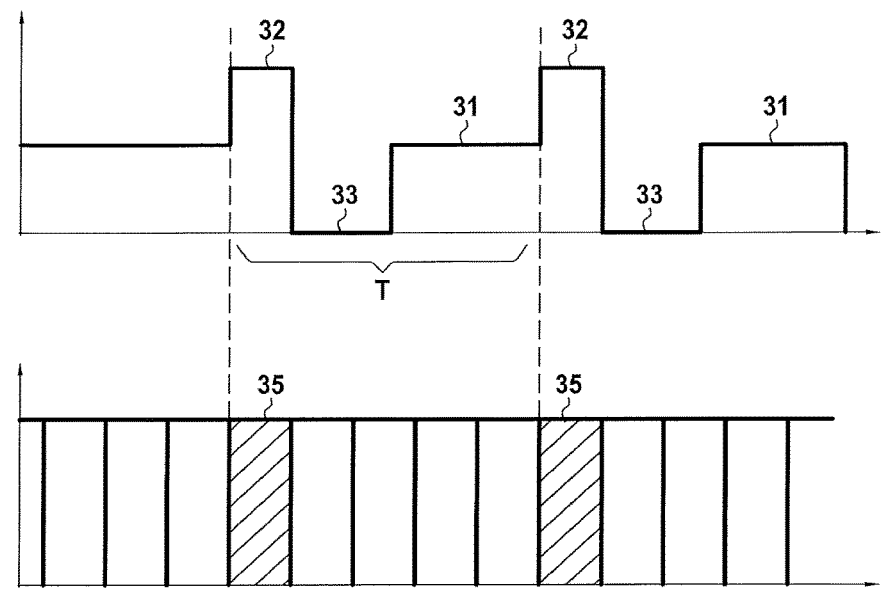
FIG. 2b represents the luminous intensity profile of the light beam emitted by the first lighting device over time when it is merged with the second lighting device, and the acquisition of images by the image sensor.

FIG. 2b represents the luminous intensity profiles of the beams emitted by the first and second lighting devices, for the case in which the light source of the first lighting device 1 is a source of visible light and when the first lighting device 1 is merged with the second lighting device 2.

In this example, the source of visible light producing the first light beam is identical to the light source producing the second light beam.

In the context of the invention, the vehicle 10 is in nighttime traffic, or when luminosity is reduced. The second lighting device 2 is therefore switched on. The source of visible light operates and emits for example a low beam or high beam type beam.

When the raw contrast of the scene SA located in front of the vehicle becomes lower than the threshold contrast value, the first lighting device 1 is switched on by the control unit 4.

When the first lighting device 1 is switched on, the source of visible light then emits a periodic light beam combining the first light beam and the second light beam. The compensation device 8 drives the source of visible light in such a way that it emits a light beam with a periodic luminous intensity profile exhibiting:
a first part 31 in which the luminous intensity is constant and equal to a positive nominal intensity. This nominal intensity corresponds to the intensity of the low beam type beam;
a second part 32 in which the luminous intensity is higher than the nominal intensity;
a third part 33 in which the luminous intensity is lower than the nominal intensity over a duration such that the average intensity of the light beam is constant and equal to the nominal intensity over a period.

The sum of the duration of each of the three parts is equal to the duration of a period. The sum of the duration of the second part 32 and of the third part 33 is less than the flicker perception time of the human eye.

It is notably less than 1/50 s, preferably less than 1/75 s.

Since the flicker perception time of the human eye is longer than the duration of a period of the luminous intensity profile, the intensity perceived by the human eye over a period is equal to the average intensity of the light beam, i.e. the intensity of the low beam light beam. Thus, the lighting modulation generated by the light source of the first lighting device is imperceptible to the driver or an external observer.

As in the case in which the first lighting device 1 and the second lighting device 2 are separate, the image sensor is synchronized with the second part 32 of the luminous intensity profile. The acquisition of an image 35 is triggered at the moment of the transition to the second part 32 of the intensity profile.

During acquisition of this image 35, the scene SA located in front of the vehicle is lit up by the first device 1 with maximum intensity. It is therefore particularly visible on this image 35. The processing unit 5 can notably detect the positions of the marking strips on this image 35 which are not visible to the driver.

Once the marking strips are identified by the processing unit, their positions are reproduced for the driver with the aid of the reproduction device. This reproduction device can be an additional lighting device 7, for lighting up frontwards of the vehicle. FIGS. 3a and 3b schematically and respectively represent the scene SA located in front of the vehicle when the additional lighting device 7 is not activated, or when the vehicle does not comprise an additional lighting device 7, and the scene located in front of the vehicle when the additional lighting device is activated.

When the additional lighting device 7 is not activated, only the first marking strips 40 close to the vehicle are visible to the driver 11.

When the additional lighting device 7 is activated, the driver 11 can also see second marking strips 41 located at a more significant distance from the vehicle than the first marking strips 40 close to the vehicle and which were not visible when the additional lighting device 7 was not activated. In FIG. 3b, only one second marking strip 41 is represented. It is understood that several second marking strips 41 can be made visible by virtue of the additional lighting device 7.

The additional lighting device 7 provides for making the scene SA located in front of the vehicle more visible, and notably the first marking strips 40 and the second marking strips 41, thereby increasing driver safety.

The method set up to implement the light system according to the invention and to arrive at increasing the visibility of the scene SA located in front of the vehicle includes a large number of steps which are presented in FIG. 4.

Step 1, E1, consists of the acquisition of the scene SA located in front of the vehicle by the acquisition device 3, and notably by the image sensor. During step 2, E2, the raw contrast $C_0$ of the images captured by the image sensor is calculated. The raw contrast $C_0$ is then compared with the predefined threshold contrast $C_s$ during step 3, E3. If the raw contrast $C_0$ is higher than the threshold contrast $C_s$, the method resumes from step E1. If the raw contrast $C_0$ is lower than the threshold contrast $C_s$, the method proceeds to step 4, E4. Step E4 consists in activating the first lighting device 1. At step 5, E5, the acquisition device 3 acquires the scene SA located in front of the vehicle. The correct contrast $C_c$ of the images captured by the image sensor is then calculated at step 6, E6. Then, during step 7, E7, the raw contrast $C_0$ of the images captured by the image sensor is calculated taking into account the lighting contribution of the first lighting device 1 in the correct contrast $C_c$. At step 8, E8, the raw contrast $C_0$ calculated at step E7 is compared with the predefined threshold contrast $C_s$. If the raw contrast $C_0$ is higher than the threshold contrast $C_s$, the method proceeds to step 9, E9. If the raw contrast $C_0$ is lower than the threshold contrast $C_s$, the method proceeds to step 10, E10. At step E9, the first lighting device is switched off, and then the method resumes from step E1. At step E10, the device for reproducing the scene SA located in front of the vehicle is activated. Following this step E10, the method resumes from step E5.

The invention claimed is:

1. Motor vehicle light system including:
   an acquisition device for acquiring the scene SA located in front of the vehicle, including an image sensor,
   a first lighting device including at least one light source suitable for emitting a first light beam of a first intensity lighting up said scene so as to increase the contrast of the images captured by the image sensor,
   a second lighting device including a light source emitting a second light beam of a second intensity performing a regulatory signalling and/or lighting function in front of the vehicle,
   a control unit which switches on the first lighting device when a first contrast value referred to as raw contrast $C_0$ of the images captured by the image sensor is lower than a predefined threshold contrast $C_s$,
   wherein the light source of the first lighting device is configured to generate modulated lighting, the modulation of which is imperceptible to the driver of said vehicle or an external observer.

2. Motor vehicle light system according to claim 1, wherein the first lighting device includes a source of infrared light and the image sensor is sensitive to infrared light.

3. Motor vehicle light system according to claim 2, wherein the light source of the first lighting device emits P-polarized light.

4. Motor vehicle light system according to claim 2, wherein the source of infrared light emits a first light beam intermittently so as to light up said scene in a discontinuous manner when the first lighting device is switched on, and the acquisition of at least one image by the image sensor is synchronized with the emission of the first light beam.

5. Motor vehicle light system according to claim 2, wherein the source of infrared light emits a first light beam continuously so as to light up said scene SA permanently when the first lighting device is switched on.

6. Motor vehicle light system according to claim 5, wherein, when the first lighting device is switched on, the source of infrared light emits a first light beam with a periodic luminous intensity profile exhibiting:
   a first part made up of one or more segments in which the luminous intensity is constant and equal to a positive or nil nominal intensity,
   a second part in which the luminous intensity is higher than the nominal intensity, and has a duration that is longer than the duration of acquisition of an image by the image sensor,
   the sum of the duration of the two parts being equal to the duration of a period, the acquisition of at least one image by the image sensor being synchronized with the second part of the luminous intensity profile.

7. Motor vehicle light system according to claim 1, wherein the first lighting device includes a source of visible light,
   and the light system comprises a compensation device for compensating for the first and second intensities of the light beams of the first and second lighting devices such that the modulation generated by the light source of the first lighting device is imperceptible to the driver or an external observer.

8. Motor vehicle light system according to claim 7, wherein the first lighting device and the second lighting device are separate.

9. Motor vehicle light system according to claim 8, wherein, when the first lighting device is switched on, the source of visible light emits a first periodic light beam with a periodic luminous intensity profile exhibiting:
   a first part made up of one or more segments wherein the luminous intensity is constant and equal to a positive or nil nominal intensity,
   a second part in which the luminous intensity is higher than the nominal intensity,
   the sum of the duration of the first part and of the second part being equal to the duration of a period, the duration of a period being less than the flicker perception time of the human eye,
   and the compensation device reduces the second intensity so as to compensate for the first and second intensities,
   the acquisition of at least one image by the image sensor being synchronized with the second part of the luminous intensity profile.

10. Motor vehicle light system according to claim 7, wherein the first lighting device and the second lighting device are merged.

11. Motor vehicle light system according to claim 10, wherein the compensation device drives the source of visible light in such a way that it emits a light beam with a periodic luminous intensity profile exhibiting:
- a first part made up of one or more segments wherein the luminous intensity is constant and equal to a positive nominal intensity,
- a second part in which the luminous intensity is higher than the nominal intensity,
- a third part made up of one or more segments wherein the luminous intensity is lower than the nominal intensity over a duration such that the average intensity of the light beam is constant and equal to the nominal intensity over a period,
- the sum of the duration of each of the three parts being equal to the duration of a period, and the sum of the duration of the second part and the third part being less than the flicker perception time of the human eye,
- the acquisition of at least one image by the image sensor being synchronized with the second part of the luminous intensity profile.

12. Motor vehicle light system according to claim 1, wherein the light source of the first lighting device emits P-polarized light.

13. Motor vehicle light system according to claim 1, wherein the motor vehicle light system includes a reproduction device for reproducing for the driver the scene SA located in front of the vehicle and captured by the acquisition device with a higher contrast than that of the same scene SA perceived by the driver without the reproduction device.

14. Motor vehicle light system according to claim 13, wherein the reproduction device is assumed to be among a head-up display, an electronic video display screen, a liquid-crystal display integrated in the vehicle or a portable electronic device.

15. Motor vehicle light system according to claim 13, wherein the reproduction device is an additional lighting device for lighting up frontwards of the vehicle and arranged to light up the strips marking the edges of the traffic lane in which the vehicle is located, in front of the vehicle.

16. Motor vehicle light system according to claim 15, wherein the additional lighting device is merged with the second lighting device.

17. Motor vehicle light system according to claim 15, wherein the additional lighting device is merged with the first lighting device.

18. Motor vehicle light system according to claim 15, wherein the additional lighting device is suitable for emitting P-polarized light.

19. Method for controlling a motor vehicle light system according to claim 1, wherein the method comprises at least the following steps in succession:
- Step 1: Acquisition of the scene SA located in front of the vehicle by the acquisition device
- Step 2: Calculation of the raw contrast $C_0$ of the images captured by the image sensor
- Step 3: Comparison of the raw contrast $C_0$ calculated at step 2 with the predefined threshold contrast $C_s$
- If the raw contrast $C_0$ is higher than the threshold contrast $C_s$, go back to step 1
- If the raw contrast $C_0$ is lower than the threshold contrast $C_s$, proceed to step 4
- Step 4: Activation of the first lighting device
- Step 5: Acquisition of the scene SA in front of the vehicle by the acquisition device
- Step 6: Calculation of the correct contrast $C_c$ of the images captured by the image sensor
- Step 7: Calculation of the raw contrast $C_0$ of the images captured by the image sensor taking into account the contribution of the first lighting device in the correct contrast $C_c$
- Step 8: Comparison of the raw contrast $C_0$ calculated at step 7 with the predefined threshold contrast $C_s$
- If the raw contrast $C_0$ is higher than the threshold contrast $C_s$, proceed to step 9
- If the raw contrast $C_0$ is lower than the threshold contrast $C_s$, go back to step 5
- Step 9: Switch-off of the first lighting device (1) and return to step 1.

20. Method according to claim 19, wherein the method comprises additionally and successively to step 8, when the raw contrast $C_0$ is lower than the threshold contrast $C_s$, a step 10 consisting of the activation of the device for reproducing the scene SA located in front of the vehicle according to one of claims 12 to 17 before going back to step 5.

* * * * *